United States Patent
Gutta et al.

(10) Patent No.: US 6,600,475 B2
(45) Date of Patent: Jul. 29, 2003

(54) SINGLE CAMERA SYSTEM FOR GESTURE-BASED INPUT AND TARGET INDICATION

(75) Inventors: Srinivas Gutta, Buchanan, NY (US); Miroslav Trajkovic, Ossining, NY (US); Mi-Suen Lee, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 188 days.

(21) Appl. No.: 09/766,710

(22) Filed: Jan. 22, 2001

(65) Prior Publication Data

US 2002/0097218 A1 Jul. 25, 2002

(51) Int. Cl.[7] .................................................. G09G 5/00
(52) U.S. Cl. ..................... 345/156; 345/157; 345/158; 345/169; 345/87; 345/127; 345/131; 345/173; 345/180; 345/207; 382/103; 348/135; 348/136; 348/207
(58) Field of Search ................................ 345/156, 157, 345/158, 169, 127, 131, 87, 180, 207, 173; 348/135, 136, 207; 382/103

(56) References Cited

U.S. PATENT DOCUMENTS

| 5,454,043 | A | | 9/1995 | Freeman | 382/168 |
|---|---|---|---|---|---|
| 5,594,469 | A | | 1/1997 | Freeman et al. | 345/158 |
| 5,809,269 | A | | 9/1998 | Favot et al. | 395/376 |
| 5,864,808 | A | | 1/1999 | Ando et al. | 704/251 |
| 6,147,678 | A | * | 11/2000 | Kumar et al. | 345/158 |
| 6,176,782 | B1 | * | 1/2001 | Lyons et al. | 463/36 |
| 6,323,839 | B1 | * | 11/2001 | Fukuda et al. | 345/157 |
| 6,434,255 | B1 | * | 8/2002 | Harakawa | 382/103 |

FOREIGN PATENT DOCUMENTS

| DK | 19845028 A1 | 9/1998 | G01R/33/28 |
|---|---|---|---|
| EP | 0588686 B1 | 7/1993 | G06F/3/00 |
| EP | WO 9634332 | 4/1996 | G06F/3/033 |
| EP | 0919906 A2 | 11/1998 | G06F/3/00 |
| WO | WO 9932959 | 12/1998 | G06F/3/033 |

* cited by examiner

Primary Examiner—Richard Hjerpe
Assistant Examiner—Jennifer T. Nguyen
(74) Attorney, Agent, or Firm—Gregory L. Thorne

(57) ABSTRACT

The position of a target lying on a plane is indicated by inputting a pointing direction which is computationally projected onto a plane. If the target is known to lie on a contour, the position is specified unambiguously. Alternatively, the position of a target can be specified by inputting its axial coordinates in successive steps. In another alternative approach, the image containing the target is translated and/or rotated and the target indicated again. The two direction projections are then used to determine the position of the target in 2-space. The direction indications may be input by a camera or other method, such as one or more radio transmitters.

10 Claims, 5 Drawing Sheets

SINGLE CAMERA SYSTEM FOR GESTURE-BASED INPUT AND TARGET INDICATION

BACKGROUND OF THE INVENTION

1. Field of the Invention

The invention relates to systems and methods for inputting information about the position of a target and more particularly to such systems that employ a single camera image.

2. Background

Many computer-based systems require information about the location of a target. For example, the familiar mouse is used to select a control or a coordinate on a screen. Another area in which target location data are input to a computer is in the field of automated video-conferencing systems. For example, a user may aim a camera at an object of interest by simply indicating the object, or by controlling it with a joystick. Work is proceeding on many fronts on systems that allow users to indicate targets without the use of a mouse or a joystick, but by using the familiar gestures normally used to indicate targets to other people.

Such gesture-based systems are more intuitive and easier to control than conventional systems that require explicit commands such as voice-command ("command-control," basically a speech-based symbol processor where each verbal command corresponds to an instruction, for example "PAN—LEFT," "UP," "DOWN'" etc.), joystick control.

There are methods of determining a direction, in which a user is pointing, using multiple camera views. For example, a camera-based system is described in detail in the article "'Finger-Pointer': Pointing interface by Image Processing" by Masaaki Fukumoto, Yasuhito Suenga and Kenji Mase. Such systems are often complex because the multiple angle views may need to be combined to generate a three-dimensional model of the actual scene in order to determine the three-dimensional vector that coincides with the user's indication. Also, the cameras need to be positioned and aimed and their positions and orientations precisely defined. The three-dimensional model is then used to determine the target to which the user is pointing. One technique for overcoming this complexity, in the limited context where the target is located in a known surface, is to use two uncalibrated cameras and planar projection transforms as described in another patent application for APPARATUS AND METHOD FOR INDICATION A TARGET BY IMAGE PROCESSING WITHOUT THREE-DIMENSIONAL MODELING, U.S. Ser. No. 09/572,991, filed May 17, 2000, the entirety of which is hereby incorporated by reference as if fully set forth herein. Here, even though calibration is not required, the method of this application requires multiple cameras which must be positioned at a substantial separation distance.

The mouse indicates the position of a desired two-dimensional coordinate on a screen by indicating relative positions. When a mouse is initially controlled, the starting position of the location indicated by it is arbitrary. Only by using feedback and relative movements can a user ultimately indicate a target position. A simple single-camera gesture-based technique, which works much like a mouse, is described in U.S. Pat. No. 5,594,469. In this method, the user's gestures are acquired by a single camera and a position indicated by feedback. The user then modifies the gesture until the fedback signal indicates the desired result. For example, the user moves his/her hand and the direction and magnitude of displacement are mapped to relative direction and magnitude displacements of a cursor on a screen. This system, however, suffers from the same drawback as a mouse or joystick in that the starting position is arbitrary and (usually visual) feedback is required.

SUMMARY OF THE INVENTION

Briefly, the position of a target lying on a plane is indicated by inputting the projection of a pointing direction onto the plane. If the target is known to lie on a contour in the plane, the position is specified unambiguously by the direction projection, the intersection of the contour and the projection being the desired target. Alternatively, the two-dimensional position of a target can be specified by inputting its axial coordinates in successive steps. In another alternative approach, the image containing the target is translated and/or rotated and the target indicated again. The intersection of the two direction projections is then used to determine the position of the target in 2-space. The direction indications may be input by a camera or other method, such as one or more radio transmitters, casting of a shadow, etc.

In the present system, the strategy is to use planar projection transforms in the manner disclosed in U.S. patent application Ser. No. 09/572,991, reference above, but instead of using two cameras to provide independent planar projections of a single direction-indicating vector onto a common plane, coordinates of a single camera's image are mapped to a known plane providing only one dimension of coordinate information rather than two. This single dimension, however, can be used in multiple ways. For example, a single-axis control such as a slider control could be controlled with pointing gestures. A point on a road shown on a road map may also be indicated. Also, by using successive gesture inputs, say one for the row and one for the column of a table, a desired cell can be indicated. Alternatively, an image of a scene can be projected onto a screen and a target indicated on the scene. Then, after the first indication, the scene may be translated and/or rotated and the target pointed out again. From the two planar projections of these two pointing indications, the target's location may be deduced by simply finding the intersection of the two projections.

The invention will be described in connection with certain preferred embodiments, with reference to the following illustrative figures, so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE PREFERRED EMBODIMENTS

Figure 1A:
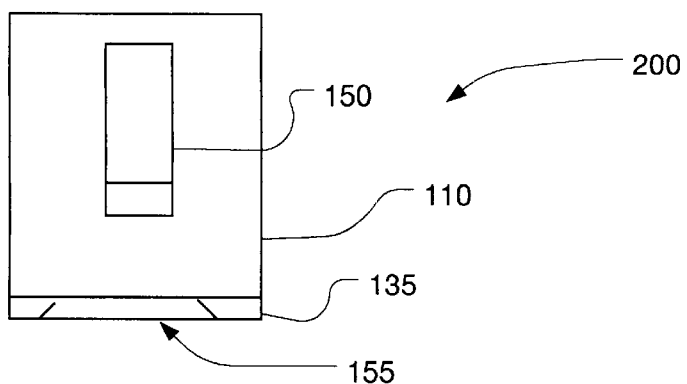
FIG. 1A is a plan view of a jig for implementing an embodiment of the invention.
Figure 1B:
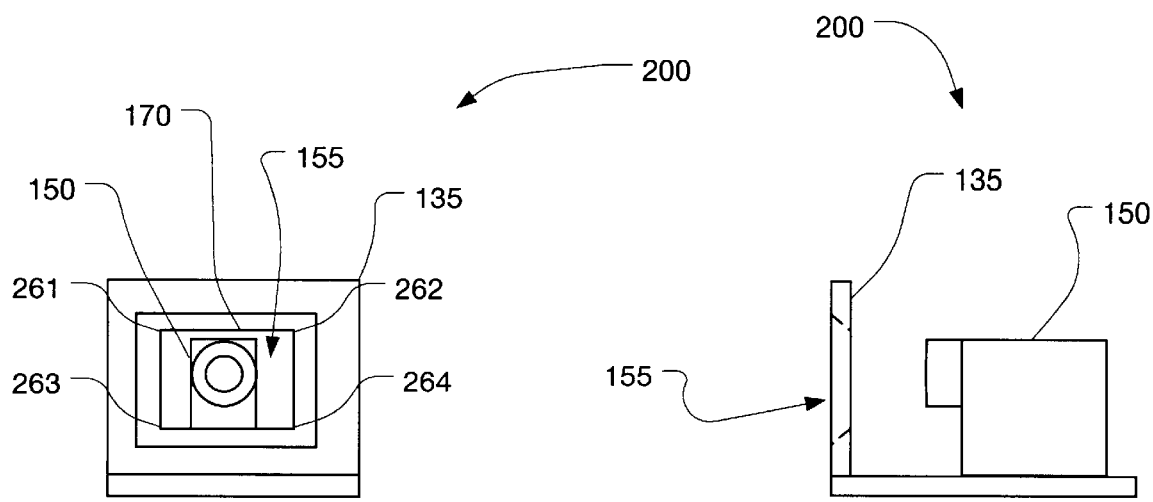
FIG. 1B is a front elevation of the jig of FIG. 1A.
Figure 1C:
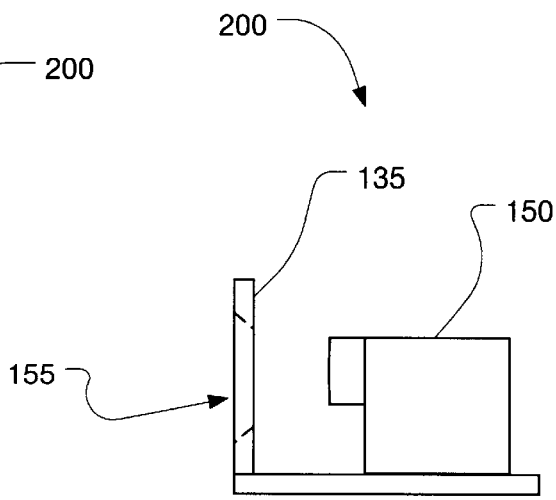
FIG. 1C is a side elevation of the jig of FIGS. 1A and 1B.

Referring to FIGS. 1A, 1B, and 1C, a camera 150 is supported on a platform 110 behind a screen 135 with an aperture 155. The camera 150 is aimable at a scene in front of the screen such that the camera 150 views the scene through the aperture 155. The camera's 150 aim is such that the edges 170 of the aperture 155 are visible in its image. Thus, the field of view of the camera 150 is slightly clipped by the aperture 155. Note in the apparatus 200, the purpose of the screen 135 is to present four markers in the form of the corners 261–264 of the aperture 155 and any apparatus that would be effective for that purpose would suffice. For example, a transparent glass with marks or a wire-frame object. The straight lines joining at corners, as provided by a rectangular aperture 155 or a wire frame, are beneficial in the sense that they allow interpolation to be used to identify the coordinates of the four corners thereby increasing precision of the coordinate measurements relative to direct measurement of small markers.

Figure 2:
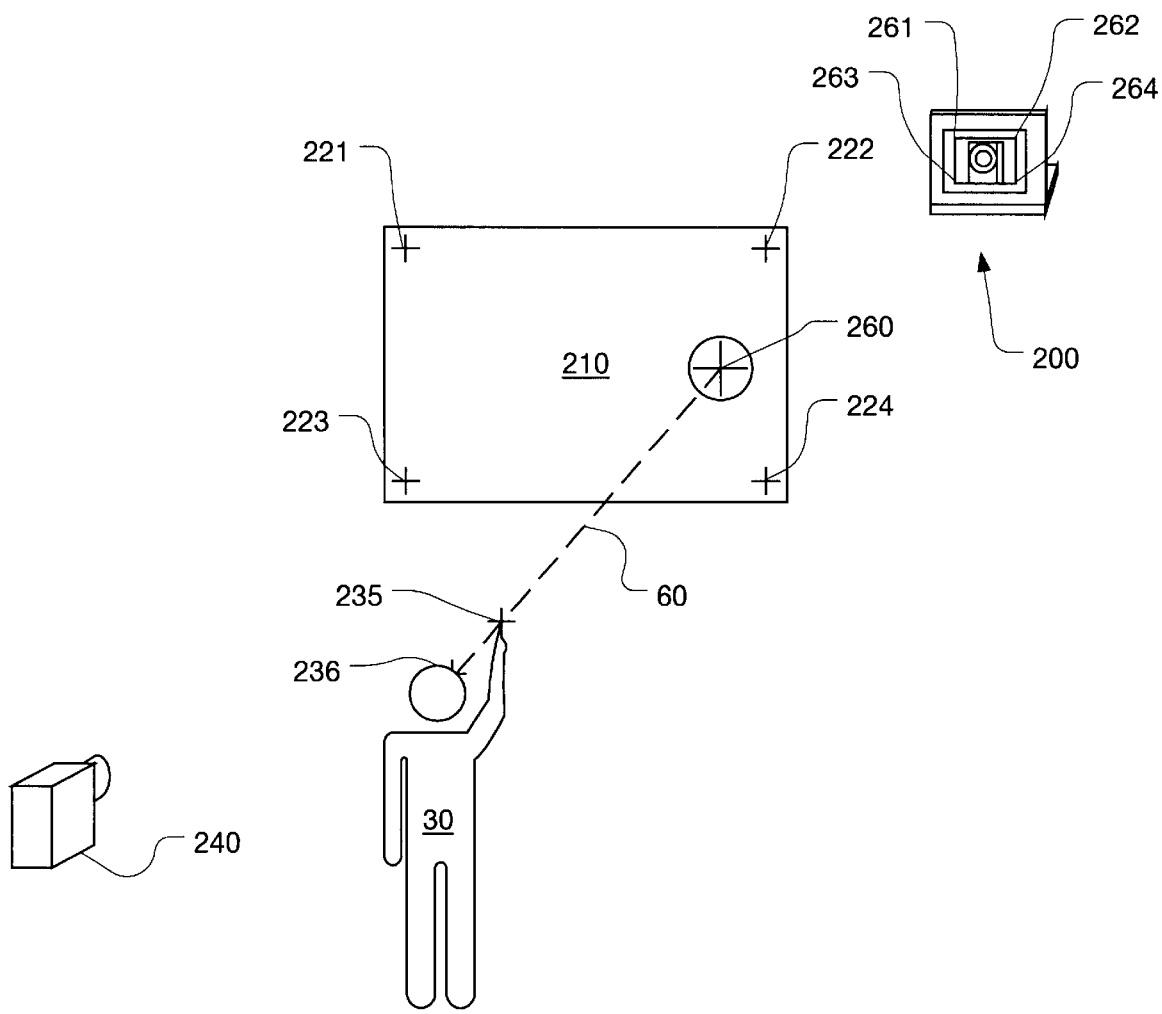
FIG. 2 is an illustration of a setup configuration used for an embodiment of the invention.

Referring now to FIG. 2, the apparatus 200 is placed in a position where it is used to view a user 30. During setup, a camera 240 is temporarily placed in a position and orientation such that the locus of points on which the target may lie, for example a screen 210, and the four points 261–264 of the apparatus 200 screen 135 are within its field of view. Four additional points 221–224 are also marked on the screen 210. The four points 221–224 are also in the field of view of the setup camera 240. A single setup image is all that is required of the setup camera 240. The image is used to calculate the planar projection transform that maps the four points 261–264 in the image of the camera 150 to the four points in the image of the setup camera 240. Once this setup transform is calculated, it is used to transform any image coordinates in the image of the camera 150 to that of setup camera 240. The image of the setup camera 240 is the basis for all target location data or its image can be transformed to any desired plane by suitably modifying the setup transform. In an example embodiment, the coordinates of the eye 236 and fingertip 235 of the user 30 are transformed from the coordinates in the camera 150 image to the coordinates of the camera 240 image.

Figure 3:
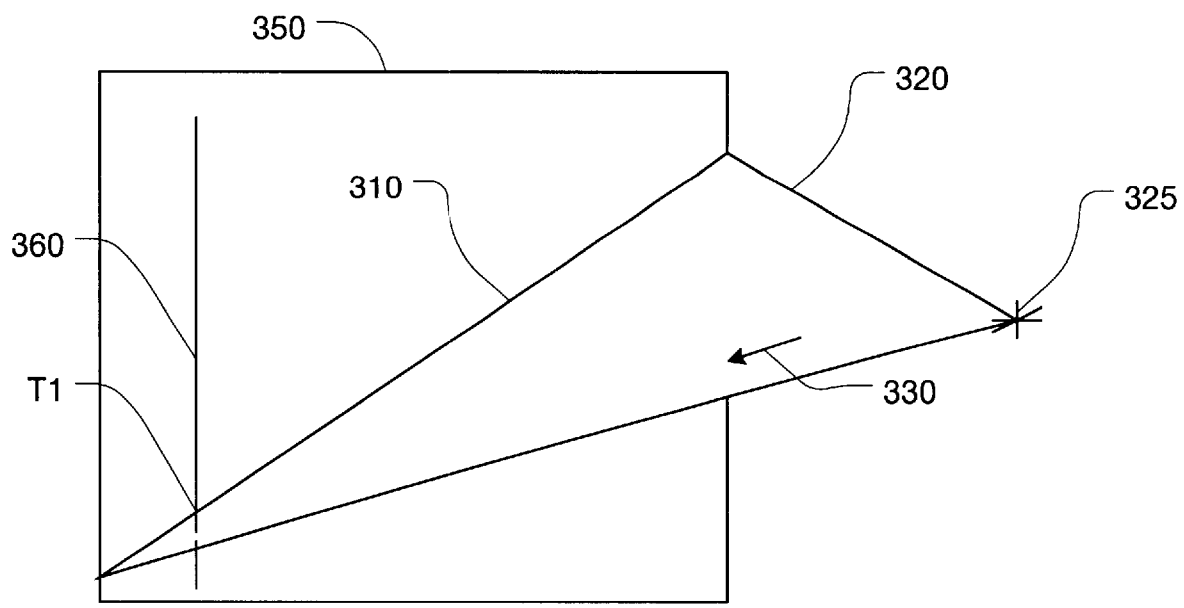
FIGS. 3 and 4 illustrate geometric relationships between planar projection coordinates in a setup camera image in which indicated positions on two contours are used to indicate a point.
Figure 4:
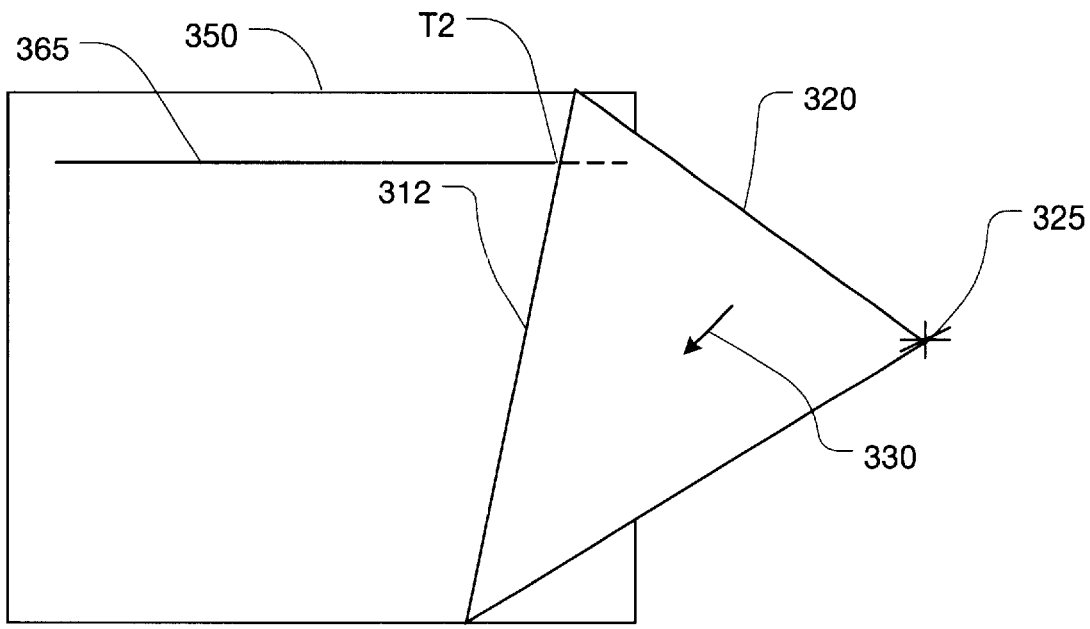

The illustration shows the user 30 pointing to a target 260 using a pointing gesture. It has been determined experimentally that the gesture used by people to point to a target, such as the target 260, is such that the user's fingertip 235, the user's right (or left) eye 230, and a target 260 are joined by a straight line. Referring now also to FIGS. 3 and 4, the plane of the screen 210 is indicated at 350 and the line joining the eye 236 and fingertip 235 of the user 30 at 330. The planar projection of the target 260 in the view of the setup camera 240 lies along the planar projection of the straight line or direction vector 330 defined by the eye 236 and fingertip 235 of the user 30. The focal point of the camera 240, indicated at 325, along with the direction vector, define a plane 320. The intersection of the plane 320, and the plane in which the target lies 350, define the projection of the direction vector 330. If the target (e.g., T1) is known to lie on a particular line or contour in the plane 350, for example a vertical axis or slider control 360, the target point may be obtained by finding the intersection of the planar projection 310 of the straight line 330 and the vertical axis or slider control 360.

Still referring to FIGS. 3 and 4, to indicate an arbitrary point on the plane 350, two axes or slider controls 360 and 365 may be projected in succession on the screen 210 and the position indicated by indicating first the vertical position on, for example, the vertical axis or slider control 360 and then the horizontal position on, for example, a horizontal axis or slider control 365. This is analogous to the way one would pick a particular cell of a table by specifying its column and then its row.

Figure 5:
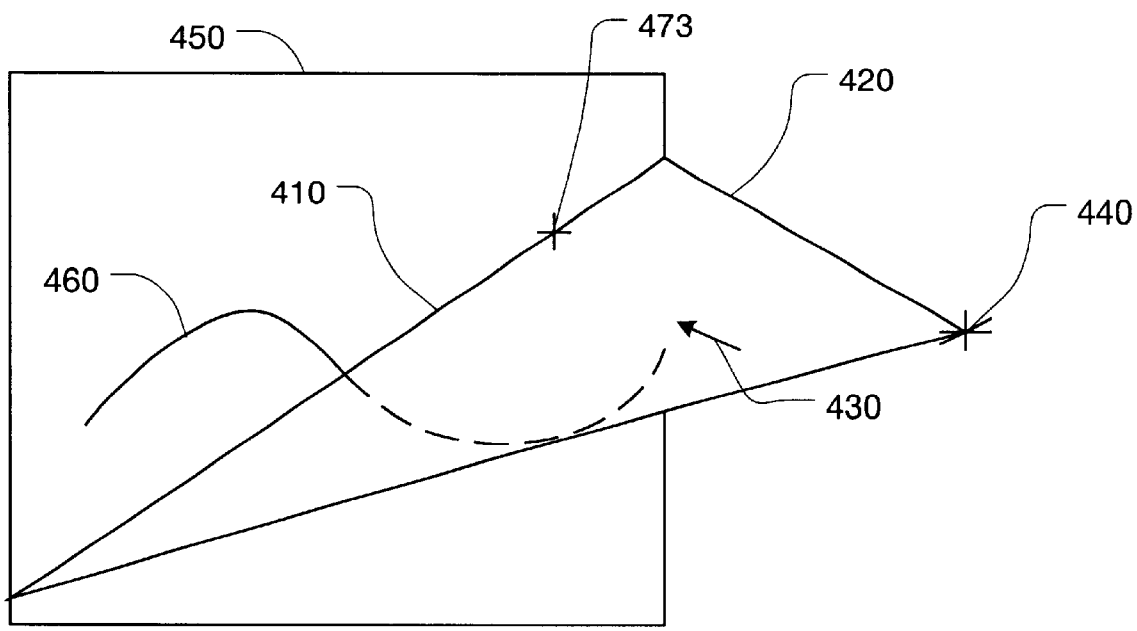
FIGS. 5 and 6 illustrate geometric relationships between planar projection coordinates in a setup camera image in which indicated positions on a single contour moved to two positions is used to indicate a point.

Referring now to FIG. 5, a point can be specified on a non-straight line 460. If the projection line 410 corresponding to the direction vector 430 intersects the curve or contour 460 at one point only, then the target point can be determined unambiguously. For example, the position of a point on a road or outline of another object could be specified in this way. Again, the target is assumed to lie in a plane 450.

Figure 6:
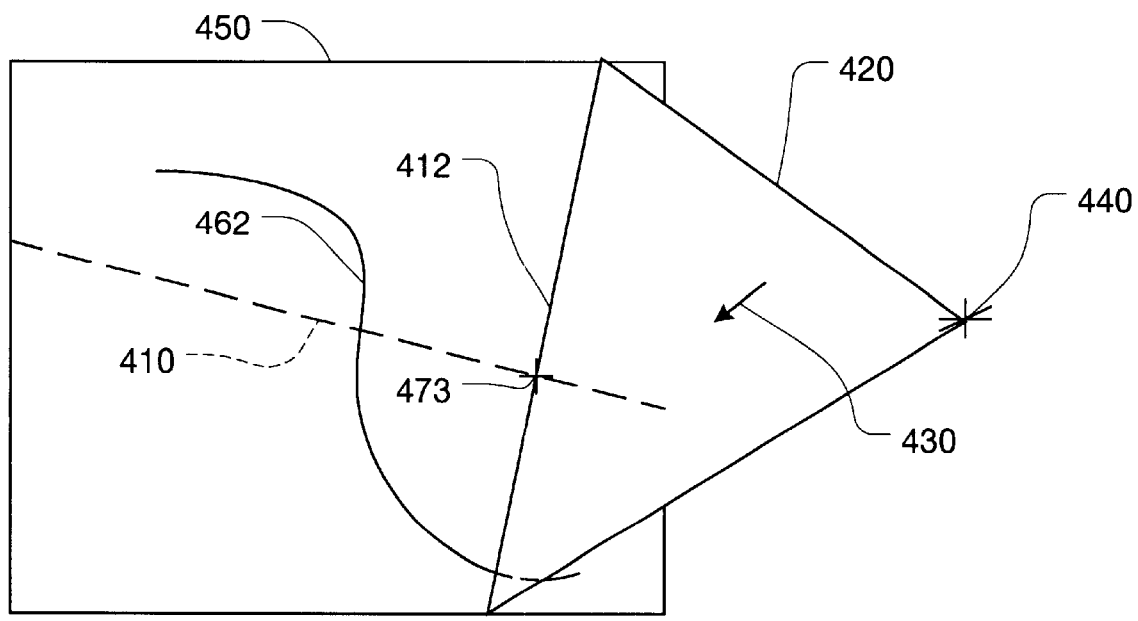

Referring now to FIGS. 5 and 6 together, suppose that an arbitrary image is specified in a first position and orientation. In the first position and orientation, a target 473 is indicated by the direction vector 430. Once this happens, the target 473 is known to lie on a path defined by the line 410 specified by the projection of the direction vector 430. In this embodiment, rather than requiring that the target 473 lie on a predefined line or contour 460, however, the image's position and/or orientation are changed and the user generates another indication represented by the direction vector 430. A second projection line 412 is then defined in the plane 450. The intersection of the projection lines 410 and 412 indicate the location of the target 473. Of course, obviously, the projection lines 410 and 412 are defined relative to the scene.

Although in the embodiment described above, the target is indicated by a pointing gesture in a particular manner (eye-to-fingertip), there is no reason this indication could not be derived in other ways. For example, a sighting device or wand could be used. Also, rather than a target on a screen, the target could be any objects or images that substantially lie on a common plane. Still further, the objects or targets need not lie on a single plane, but could lie on multiple planes, each of which has a respective set of registration marks. The invention may also be extended by using other transforms so that targets can lie on surfaces other than flat surfaces. Still another variation is in the manner of gesturing to indicate a direction. A time series of images can be used to derive a direction such as the direction of a sweep of a hand or finger over a short interval of time as would attend a moving gesture to indicate a direction. Also, another suitable application would be a white-board application. Still further, registration marks need not be marks on a screen, but may be the corners of a screen. Also, registration marks may be projected on the screen at one point during setup and then removed. The registration point coordinates may then be used to compute the transform without further reference to the registration marks until the setup is changed. Another application of this technology is for use in aiming a camera at the target. Once the coordinates in the reference image are known, a camera may be re-aimed and zoomed to acquire the target. This would be useful in the context of an automated videoconference system.

Figure 7:
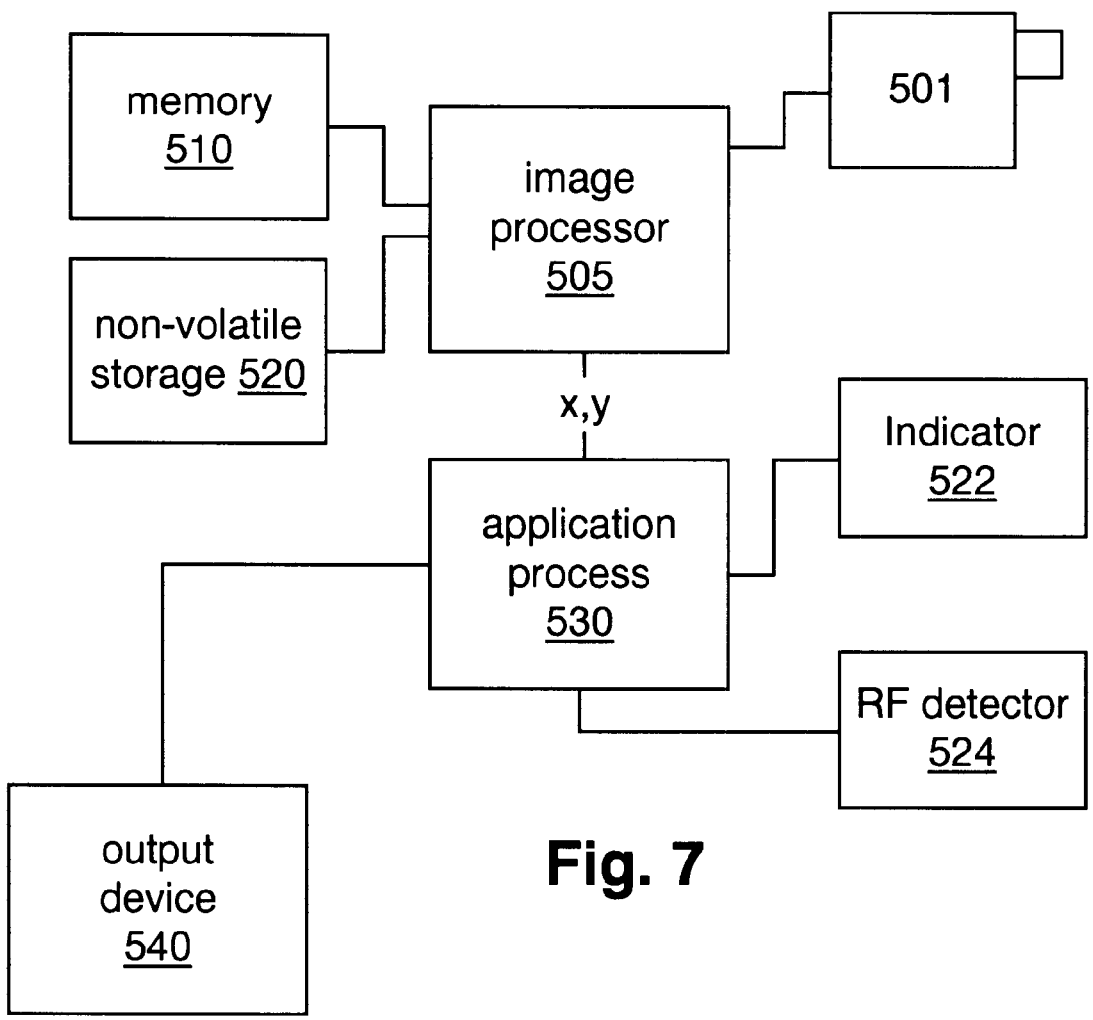
FIG. 7 is an illustration of a physical configuration that may be used to implement the present invention.

Referring now to FIG. 7, the devices and processes that may be used to implement applications of this invention are illustrated in a block diagram. An image processor 505 receives image data from a camera 501. Image and coordinate data may be stored in a memory 510 or non-volatile storage 520. For example, the transform data, once computed, may be stored in the non-volatile memory 520 and the memory 510 used in the computation of the image from the camera 501 to derive coordinates x, y of the target which may be applied to an application process 530. The application process may command multiple image processing steps to effect the successive target-indicating steps discussed above. Each time a target is indicated, an indicator 522, such as a voice-response system, may indicate the user's input. In a voice-response system, the user may indicate that his/her current gesture is completed by saying a particular word or command. Alternatively, the user may indicate the same using gesture, a remote control button, or other indicator 522. The application process 530 then generates an output on an output device 540, such as a trace on a whiteboard or control data for an avatar of a game. In systems where the planar projection is obtained through a radio device, an RF detector 524 may be provided.

Note that the projection data gathered by the camera 501 could also be derived from other sources such as sonar, radio, ultrasound medical equipment or any other device that is capable of forming a planar projection. Note also that the identical computation methodology may be used in connection with a pointing indicator other than one whose orientation is acquired by way of cameras. For example, the orientation of a sighting tube or gun-sight with radio transmitters could be acquired by a computer and used to determine the position of a target on a screen. The technology used for radio-based writing tablets, networked whiteboard applications, and such could be employed to determine the orientation of a pointing device avoiding the need for cameras altogether. Note that this device could also be used in U.S. patent application Ser. No. 09/572,991, which was incorporated by reference above.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of determining a position of an unknown point lying on a predefined plane, comprising the steps of:
   generating an indication of a line in space;
   inputting a planar projection of said line in space;
   determining a position along a known path lying in a plane by determining an intersection of said known path and said planar projection;
   generating another indication of a line in space; inputting another planar projection of said another line in space;
   determining another position along another known path lying said plane by determining an intersection of said another known path and said another planar projection and calculating coordinates of a target point in said plane from said indication determining indicating.

2. A method as in claim 1, wherein said step of generating includes a human gesture.

3. A method as in claim 2, wherein said step of inputting includes acquiring an image via a camera.

4. A method as in claim 1, wherein said step of inputting includes transforming a planar projection of a camera image to another plane by a planar projection transform.

5. A method as in claim 1, wherein said step of generating includes aiming a pointing device and acquiring an orientation of said pointing device by at least one of imaging with a camera and detecting with a radio receiver.

6. A method as in claim 1, wherein said step of calculating includes calculating an intersection of said known path and said another known path.

7. A method of determining a position of an unknown point lying on a predefined plane, comprising the steps of:
   generating an indication of a first line in space aimed at a target on a known two-dimensional surface;
   inputting a first indication of said first line in space and determining a first planar projection of said first line in space;
   changing a position of said target on said plane;
   generating an indication of a second line in space aimed at said target;
   inputting a second indication of said second line in space and determining a second planar projection of said second line in space; and
   calculating a position of said target responsively to said first and second planar projections.

8. A method as in claim 7, wherein said step of changing includes projecting an image of a scene including said target and changing said image of said scene such as to preserve relationships of objects in said scene at constant respective relative orientations and positions.

9. An image processing computer for identifying a one-dimensional position of a target, comprising
   a controller connectable to a camera to receive images therefrom;
   said controller being programmed to calculate from a first of said images a first planar projection of an indication in said first of said images of a first direction onto a predefined plane;
   said controller being further programmed to calculate a first intersection of said first planar projection and a first predetermined line lying in said predefined plane;
   said controller being further programmed to output an indication of said first intersection, wherein:
       said controller is programmed to calculate from a second of said images a second planar projection an indication in said second of said images of a second direction onto said predefined plane;
       said controller is programmed to calculate a second intersection of said second planar projection and a second predetermined line lying in said predefined plane;
       said controller is programmed to calculate a target position responsively to said first and second intersections;
       said indication of said first intersection includes said target position.

10. A computer as in claim 9, wherein said controller is programmed to generate an image coinciding with said first predetermined line on a surface coinciding with said predefined plane.

* * * * *